United States Patent [19]

van Drooge

[11] 4,346,000
[45] Aug. 24, 1982

[54] REACTOR FOR ANAEROBIC PREFERMENTATION OF AQUEOUS WASTE WATERS

[75] Inventor: Barend L. van Drooge, Amsterdam, Netherlands

[73] Assignee: Stork Amsterdam B.V., Amsterdam, Netherlands

[21] Appl. No.: 201,078

[22] Filed: Oct. 27, 1980

[30] Foreign Application Priority Data

Oct. 26, 1979 [NL] Netherlands .......................... 7907897

[51] Int. Cl.³ .............................................. C02F 3/28
[52] U.S. Cl. ................................ 210/195.1; 210/207; 210/218; 210/262
[58] Field of Search ...................... 210/195.1, 197, 207, 210/208, 201, 218, 256, 261, 262; 435/287, 304, 801

[56] References Cited

U.S. PATENT DOCUMENTS

| | | | |
|---|---|---|---|
| 1,199,099 | 9/1916 | Münzer | 210/256 |
| 2,366,898 | 1/1945 | Gurney | 210/208 |
| 2,889,929 | 6/1959 | Kivell | 210/261 |
| 3,520,802 | 7/1970 | Pavia | 210/631 |
| 3,525,437 | 8/1970 | Kaeding et al. | 210/261 |
| 3,753,897 | 8/1973 | Lin et al. | 210/256 |
| 4,008,153 | 2/1977 | Mackrle et al. | 210/261 |
| 4,022,665 | 5/1977 | Ghosh et al. | 435/801 |
| 4,165,285 | 8/1979 | Wind et al. | 210/256 |

FOREIGN PATENT DOCUMENTS

| | | |
|---|---|---|
| 12476 | 6/1980 | European Pat. Off. . |
| 1055457 | 4/1959 | Fed. Rep. of Germany . |
| 2187384 | 1/1974 | France . |
| 7811999 | 6/1980 | Netherlands . |
| 111401 | 12/1917 | United Kingdom . |
| 1297959 | 11/1972 | United Kingdom . |
| 2007205 | 5/1979 | United Kingdom . |

Primary Examiner—Benoît Castel
Attorney, Agent, or Firm—Burton, Parker & Schramm

[57] ABSTRACT

Reactor for anaerobic prefermentation of aqueous waste waters provided with a waste water inlet, an outlet for discharging prefermented waste water and a sludge outlet. The interior of the reactor comprises one first reactor space and one second reactor space, while a precipitation cone is suspended by ribs between the first and second space. A covering sheet extends from the wall of the reactor into the precipitation cone, said covering sheet being provided with a gas escaping tube which ends above the upper edge of precipitation cone.

The reactor is further provided with a storage vessel for supplying basic substances to the second reactor space. The outlet debouches into an annular precipitation space having an annular partition; the precipitation space is further bounded by an annular overflow with tooth-shaped recesses.

At last a protein removing line and a liquid drain-cock are present.

7 Claims, 2 Drawing Figures

REACTOR FOR ANAEROBIC PREFERMENTATION OF AQUEOUS WASTE WATERS

BACKGROUND OF THE INVENTION

1. Field of the Invention

The present invention relates to a reactor for anaerobic prefermentation of aqueous waste waters to be purified by anaerobic fermentation of organic material, said reactor comprising a waste water inlet, a liquid outlet for the discharge of prefermented waste water and a sludge outlet.

2. Description of the Prior Art

Reactors for anaerobic prefermentation of aqueous waste waters which are purified by an anaerobic fermentation of organic material have been used in the prior art. In these reactors the waste water inlet debouches into the lower side of the reactor, the waste water outlet debouches into the upper side of the reactor.

The difficulty with these known reactors is that waste waters to be processed, which contain oil, carbohydrates, proteins and/or fibrous materials, such as waste waters derived from palm oil industries, cannot be sufficiently purified, since the latter substances are insufficiently removed from waste waters to be purified. Consequently, said oil, carbohydrates, proteins and/or fibrous materials, will arive in the main fermentation reactor, where they may give rise to overloading of said reactor due to their long decomposition times.

In this respect it should be noted that especially carbohydrates and proteins will keep solid particles and oil particles suspended in liquids, so that said particles may be easily maintained with waste waters to be purified, into the main fermentation reactor, where they may give rise to overloading problems.

SUMMARY OF THE INVENTION

In view of the foregoing factors and conditions of the prior art it is a primary object of the present invention to provide a reactor for anaerobic prefermentation of aqueous waste waters which will not exhibit said disadvantages and in which solid particles and oil particles suspended in the prefermented waste waters will be removed from said waters as much as possible prior to discharging the said liquid from the reactor for the anaerobic prefermentation.

This object is attained in accordance with the present invention in that the said reactor at least comprises one first and one second reactor space being in open connection with each other, the waste water inlet and the sludge outlet debouching into the first reactor space.

The favorable result of a reactor of this type is, that both a high solid substance concentration prevails in the first reactor space and a low pH ranging from 3 to 6, due to the acidifying action of the bacteria being present in the waste waters, so that proteins in said waste waters, being insoluble in case of a low pH, will either precipitate or will start floating, whilst on the other hand solid particles being present in said first reactor space are filtered off. In this first reactor space, furthermore heavy metals, chlorinated hydrocarbon compounds and the like are retained, due to the presence of the solid substances.

In the second reactor space the carbohydrates and proteins in the waste waters may then especially by controlling the pH-value, be converted into volatile fatty acids and alcohol. Said conversion of proteins and carbohydrates which especially exert a suspending action upon oil particles and solid particles, will, moreover, cause the oil particles to be separated from the waste waters, whilst the solid particles still present, may precipitate.

In order to optimally decompose proteins and carbohydrates, means are provided in the second reactor space for controlling the pH in said second reactor space.

Due to the advantageous presence of a centrally suspended precipitation cone in between the first and the second reactor space, solid particles being separated in said reactor space may be recovered as centrally as possible, whilst on the other hand the means for suspending said precipitation cone will restrict a stirring movement from the second reactor space toward the first reactor space in which latter space such a stirring movement is undesirable.

The separation of liquid substances (such as oils) and solid substances is advantageously improved furthermore, in that the reactor comprises a precipitation space which is connected with the liquid outlet. Such a precipitation space can easily be formed in the upper side of the reactor by positioning a partition at said location.

So as to effect an optimum separation of liquid substances such as oils, from the prefermented waste waters, said precipitation space is connected with the second reactor space, situated therebelow through an overflow, which appropriately projects above the plane through the highest point of the liquid outlet. The latter measure ensures that the prefermented waste water flowing into the precipitation space across the overflow, will almost present a laminar flow, thus ensuring an optimum separation of liquid substances.

An additional improvement of the separation of liquid substances, may still be effected by providing the precipitation space with means restricting a flow of liquids, which means preferably consist of a partition being connected with the upper side of the reactor, which partition extends in the precipitation space to below the upper edge of the overflow.

Said overflow may advantageously be provided with recesses, which are preferably tooth-shaped, and which improve a continuous stream of prefermented waste waters.

The features of the present invention which are believed to be novel are set forth with particularity in the appended claims.

Other claims and many of the attendant advantages will be more readily appreciated as the same becomes better understood by reference of the following detailed description and considered in connection with the accompanying drawing in which like references symbols designate like parts throughout the figures.

DESCRIPTION OF A PREFERRED EMBODIMENT

Figure 1:
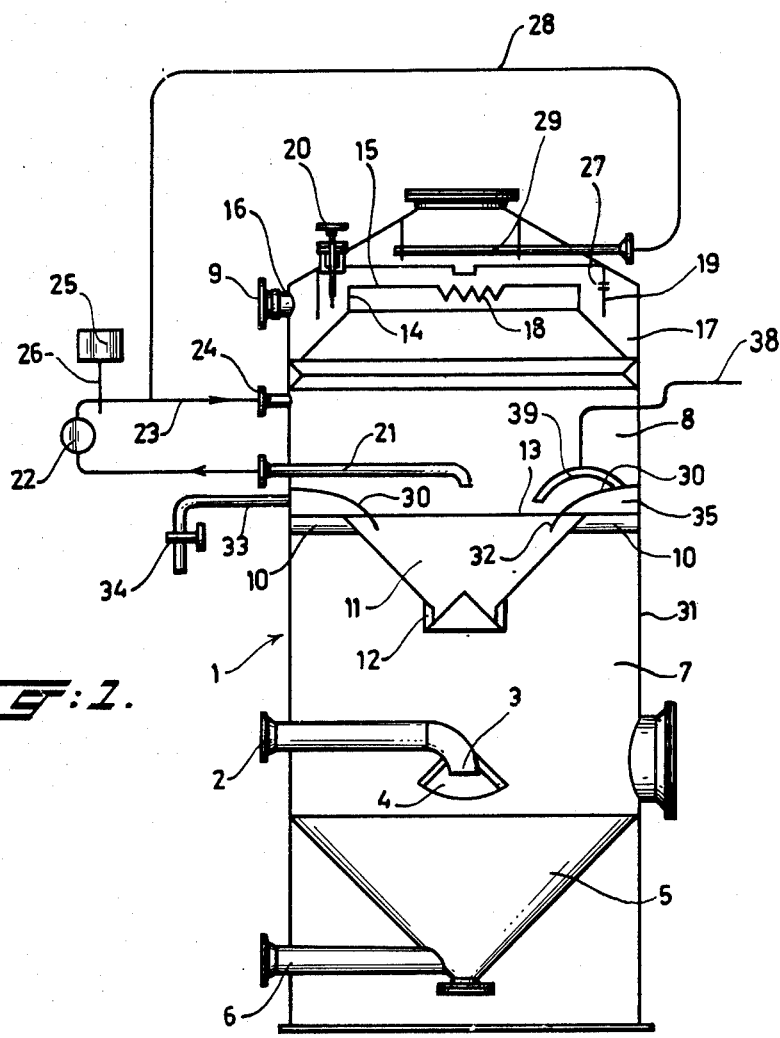
FIG. 1 is a schematical view of a reactor for anaerobic prefermentation of aqueous waste waters according to the present invention and FIG. 2 is a detail of the reactor of FIG. 1.
Figure 2:
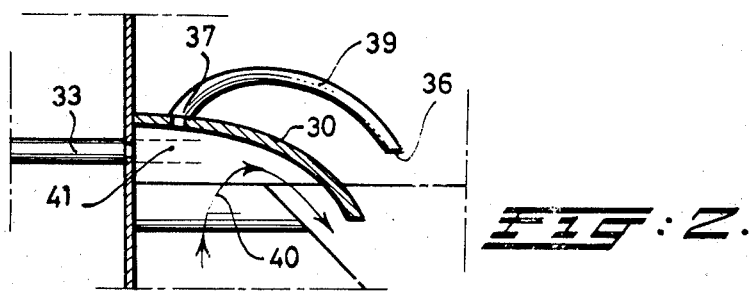

In order to best understand the present invention a description of a preferred embodiment thereof is provided accompanied by drawings. In FIG. 1 a reactor is shown being provided with a waste water inlet 2, debouching approximately into the center of the reactor through a mouth 3 in the vicinity of which a collision plate 4 is accommodated which plate improves an initial separation of solid substances from supplied waste waters.

The lower part of the reactor comprises a conical space 5 for receiving sludge, which is separated on the one hand from the waste waters during the anaerobic fermentation and for receiving on the other hand the protein comprising sludge formed during the anaerobic prefermentation.

For discharging said sludge, a sludge outlet 6 is present. A high concentration of solid substances prevails in the first reactor space 7 of the reactor as well as a low pH, ranging from 3 to 6, due to the acidifying action of the bacteria present in the waste waters. Consequently the proteins being present in the waste waters which are insoluble at a low pH, will precipitate, whilst suspending particles in the waste water will be filtered off, due to the presence of the solid substances.

As seen in the direction of the waste water outlet 9, a second reactor space 8 adjoins the first reactor space 7. In said second reactor space 8 carbohydrates and proteins in waste waters are converted into volatile fatty acids and alcohol. The waste water to be purified and to be subjected to a prefermentation, flows from space 7 into the second reactor space 8 via openings between ribs 10.

The center of the reactor comprises a precipitation cone 11, being suspended by means of ribs 10, in which solid substances from the second reactor space 8 may precipitate, which solid substances are then moving into the first reactor space 7 through cone outlet 12. Due to the low pH prevailing at that location, the proteins present in the liquids will immediately precipitate and will be received in the sludge which is gathered in the conical outlet space 5.

The ribs 10 will interrupt the stirring movement as performed in the second reactor space 8, so that an optimum precipitation of substances may take place in the first reactor space 7.

The upper side of the second reactor space 8 is surrounded by an annular overflow 14, having an upper edge 15, which has a level being higher than the upper side 16 of the outlet 9 for the discharge of prefermented waste water.

A precipitation space 17 is thus formed, for improving the precipitation of solid substances being present in the prefermented waste waters, which waste waters flow across the upper edge 15 of the overflow 14.

In order to obtain a flow of liquid into the precipitation space being as even as possible, the circumference of the overflow 14 is lowered by means of the tooth-shaped recesses 18. In order to avoid floating oil particles as well as possible, an annular partition 19 is advantageously provided at the upper side of the reactor 1, which annular partition extends to below the upper edge 15 of the overflow 14 and of course below the tooth-shaped recesses 18. Said annular partition 19 is effectively situated at about ⅔ of the distance between the inner wall of the reactor and the wall of the overflow 14. The annular partition 19 preferably comprises openings 27 for the escape of gases, and on the other hand, for retaining oily substances.

During the decomposition of proteins and carbohydrates which act as oil and solid substances suspending compounds, which oil and solid substances may give rise to overloads impairing a subsequent anaerobic fermentation in the main reactor, the precipitation of solid substances from waste water will be so improved that said substances will, together with formed bacteria material, arrive in the first reactor space 7, through the precipitation cone 11.

Furthermore, oily substances being present in the waste waters, together with oily substances which might have been formed during the anaerobic fermentation, can be drained off via drain cock 20.

For an effective control of the pH desired for the anaerobic fermentation in the second reactor space 8, a supply line 21 which debouches approximately into the center of said space 8, is connected with a pump 22 which in turn, through line 23 is connected with a tangential inlet 24, so that liquid can be recirculated into said second reactor space 8. Said tangential inlet 24 ensures an optimum stirring in space 8.

A storage vessel 25 for caustic soda or other hydroxides, connected with line 23 through a supply line 26, effects the control of the respective pH.

The liquid flowing toward the precipitation zone 17, may comprise foam, which is preferably removed by means of liquid dividing spray heads 29 upon a circuit 28, which debouches above the inner circumference bounded by the overflow 24, said circuit being connected with the return line as mentioned hereinbefore, through a line 28.

The first reactor space may comprise liquid with suspended proteins, which might arrive in the second reactor space 8. In order to prevent the latter, a protein recovering region 35 is advantageously formed by a covering sheet 30, which is curved from the reactor wall 31 to within the precipitation cone 11. The edge region 32 extends to below the upper edge 13 of the precipitation cone 11. A protein recovering line 33 may then discharge suspended proteins which are gathered below the covering sheet 30. The protein recovering line 33 comprises a close off valve 34.

It should be noted that not only proteins, but also other floating substances may be gathered below the covering sheet 30.

Obviously gases might collect below covering sheet 30 and after some time the amount of gases may be so high that no further flow of liquid from space 7 into cone 11 is possible, this flow being indicated by the arrow 40. Thus the curved covering sheet 30 is provided with a curved gas escaping tube 39, which tube 39 debouches into the space 35 below covering sheet 30, near the outer wall 31 of the reactor 1 through opening 37. On the other hand the tube 39 debouches, by means of an end 36, at a point above the upper edge 13 of cone 11. The position of end 36 may be controlled by controlling means 38 allowing a displacement of the end 36 toward the upper side or toward the lower side of the reactor.

Preferably the end 36 is in a flat plane comprising the protein recovering line 33 for recovering the protein layer 40 indicated by dotted lines. It should be noted that an opening 37 in the covering sheet would disturb the working of the reactor as such an opening would allow a free flow of liquid into second space 8 without said flow passing the cone 11.

It should be noted that line 33 also allows a removal of other floating substances than proteins through valve 34.

The tube 39 should not allow a free flow of liquid through covering sheet 30 and thus this tube is a curved tube.

The flow of liquid from first space 7 into second space 8 is indicated by arrow 40.

What is claimed is:

1. Reactor for anaerobic prefermentation of aqueous waste waters to be purified by anaerobic fermentation of organic material, said reactor comprising a waste water inlet (2), a liquid outlet (9) for the discharge of prefermented waste water and a sludge outlet (6), the reactor at least comprising one first (7) and one second reactor (8) space being in open connection with each other, the waste water inlet (2) and the sludge outlet (6) debouching into the first reactor space, means (25) for controlling and adjusting the pH in the second reactor (8) space, a centrally suspended annular precipitation cone provided between the first and second reactor space and being connected with the liquid outlet (9) and/or with the second reactor space, through an overflow and a gathering chamber for gathering proteins floating upon the liquids in the first reactor space, said gathering chamber being bounded by a covering sheet extending from the reactor wall into the precipitation cone at a point below the cone's upper edge, while a curved gas escaping tube debouches on the one hand into the gathering space below said covering sheet, and on the other hand, by means of an end to above the upper edge of the cone, said reactor further comprising a floating solids drain line which debouches into the gathering chamber.

2. Reactor according to claim 1, in which the second reactor space (8) is provided with a pump supply line (21) and with a, tangentially disposed, return inlet (24) connected with said pH control means (25).

3. Reactor according to claim 1, in which the reactor is provided in front of the liquid outlet, with means improving the separation of solid substances.

4. Reactor according to claim 1, in which the precipitation cone is bounded by an overflow, the level of the upper edge of which projects above the plane through the highest point of the liquid outlet, at least a part of the overflow being lower than the overflow proper, said overflow being, at least locally, provided with tooth-shaped recesses.

5. Reactor according to claim 4, in which means are provided in the precipitation cone, restricting the flow of liquids, said means consisting of a partition being connected with the upper side of the reactor, and extending in the precipitation cone to below the upper edge of the overflow, said upper side of the reactor comprising a drain-cock for the discharge of liquid substances having a lower density than water, whilst the partition is provided with openings for the escape of gases and within or below the precipitation space a liquid dividing member is provided.

6. Reactor according to claim 1, in which the waste water inlet comprises a collision plate in the vicinity of the mouth of said inlet.

7. Reactor for anaerobic prefermentation of aqueous waste waters to be purified by anaerobic fermentation of organic material, said reactor comprising a waste water inlet (2), a liquid outlet (9) for the discharge of prefermented waste water and a sludge outlet (6), the reactor at least comprising one first (7) and one second reactor (8) space being in open connection with each other, the waste water inlet (2) and the sludge outlet (6) debouching into the first reactor space, means (25) for controlling and adjusting the pH in the second reactor (8) space, an annular precipitation space being provided between the first and second reactor space and being connected with the liquid outlet and/or with the second reactor space, through an overflow; the precipitation space being bounded by an overflow, the level of the upper edge of which projects above the plane through the highest point of the liquid outlet, at least a part of the overflow being lower than the overflow proper, said overflow being, at least locally, provided with tooth-shaped recesses, further comprising means which are provided in the precipitation space, restricting the flow of liquids, said means consisting of a partition being connected with the upper side of the reactor, and extending in the precipitation space to below the upper edge of the overflow, said upper side of the reactor comprising a drain-cock for the discharge of liquid substances having a lower density than water, while the partition is provided with openings for the escape of gases and within or below the precipitation space a liquid dividing member is provided, further comprising a gathering chamber for gathering proteins floating upon the liquids in the first reactor space, said gathering chamber being bounded by a covering sheet extending from the reactor wall into the precipitation cone, while a curved gas escaping tube debouches on the one hand into the gathering space below said covering sheet, and on the other hand, by means of an end to above the upper edge of the cone.

* * * * *